Sept. 8, 1931.  I. NUÑEZ  1,822,309
DOUGH CUTTING MACHINE
Filed July 11, 1930   4 Sheets-Sheet 1
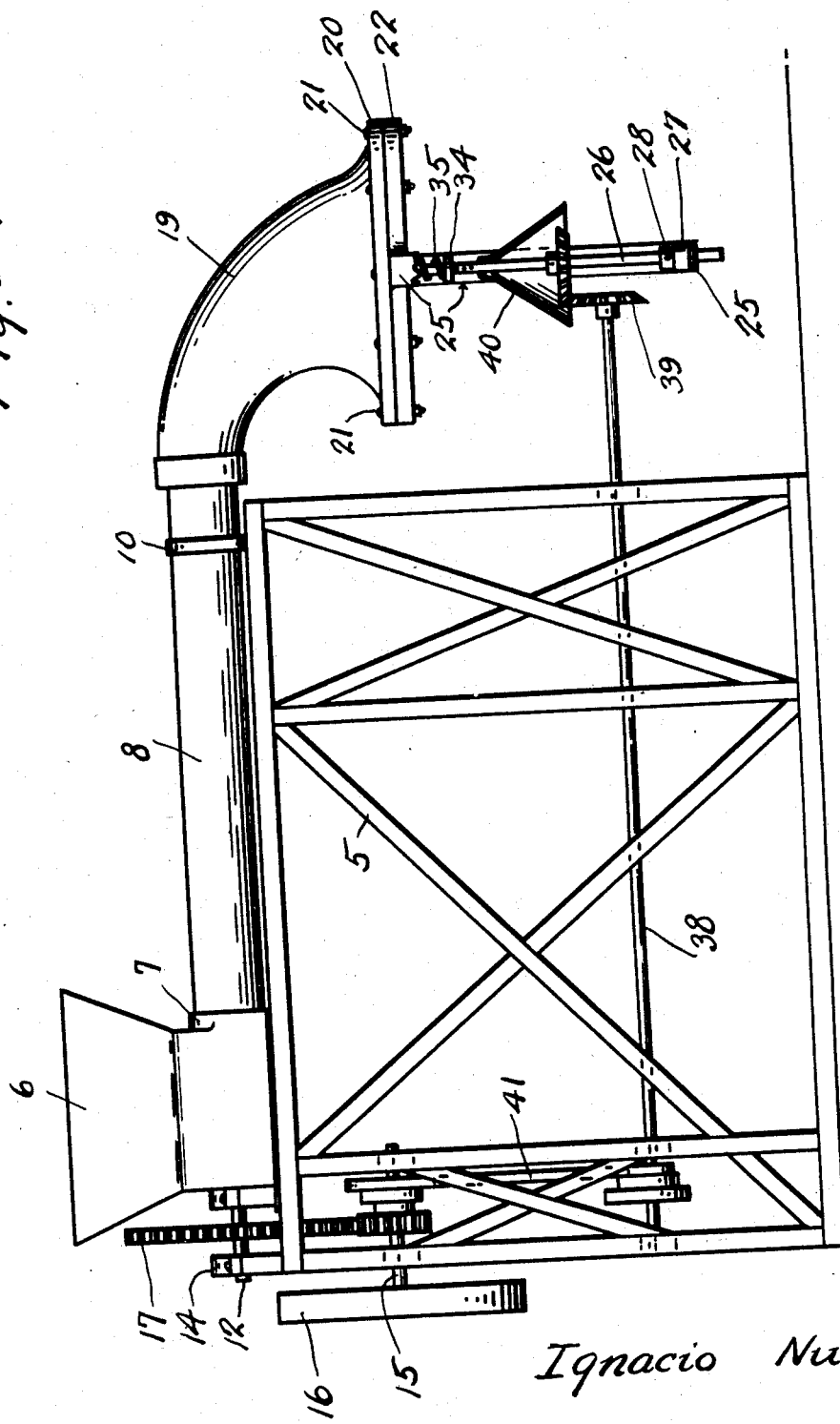
Inventor
Ignacio Nuñez
By Clarence A. O'Brien
Attorney

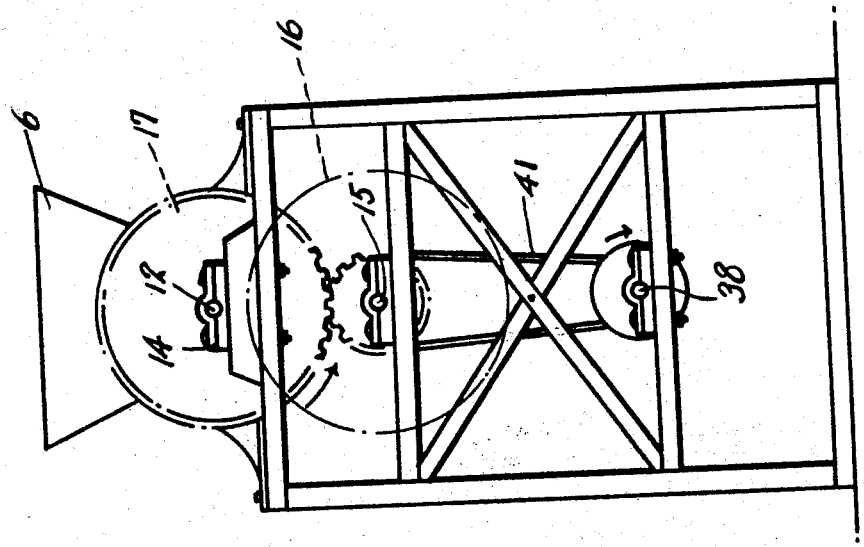
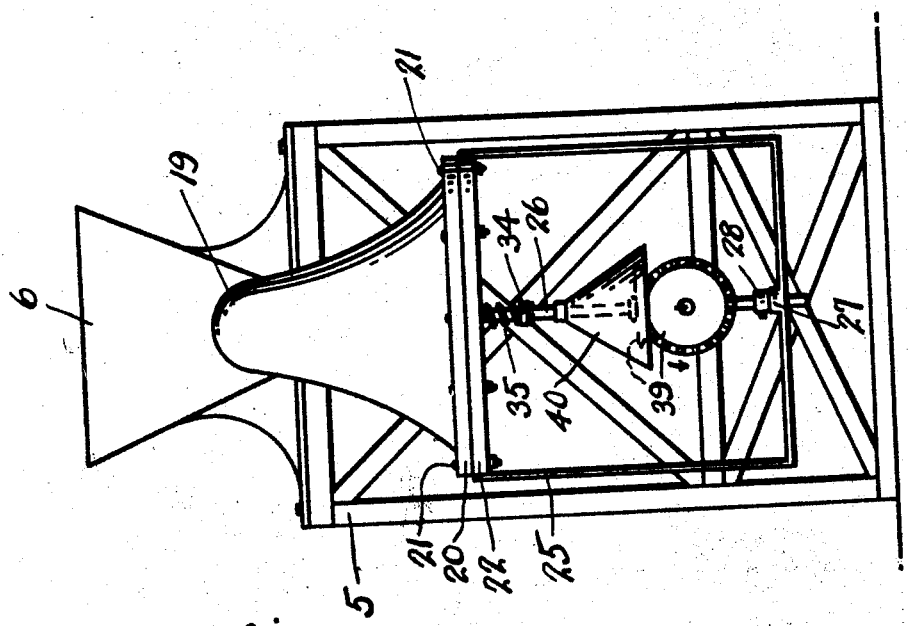

Sept. 8, 1931.  I. NUÑEZ  1,822,309
DOUGH CUTTING MACHINE
Filed July 11, 1930   4 Sheets-Sheet 3
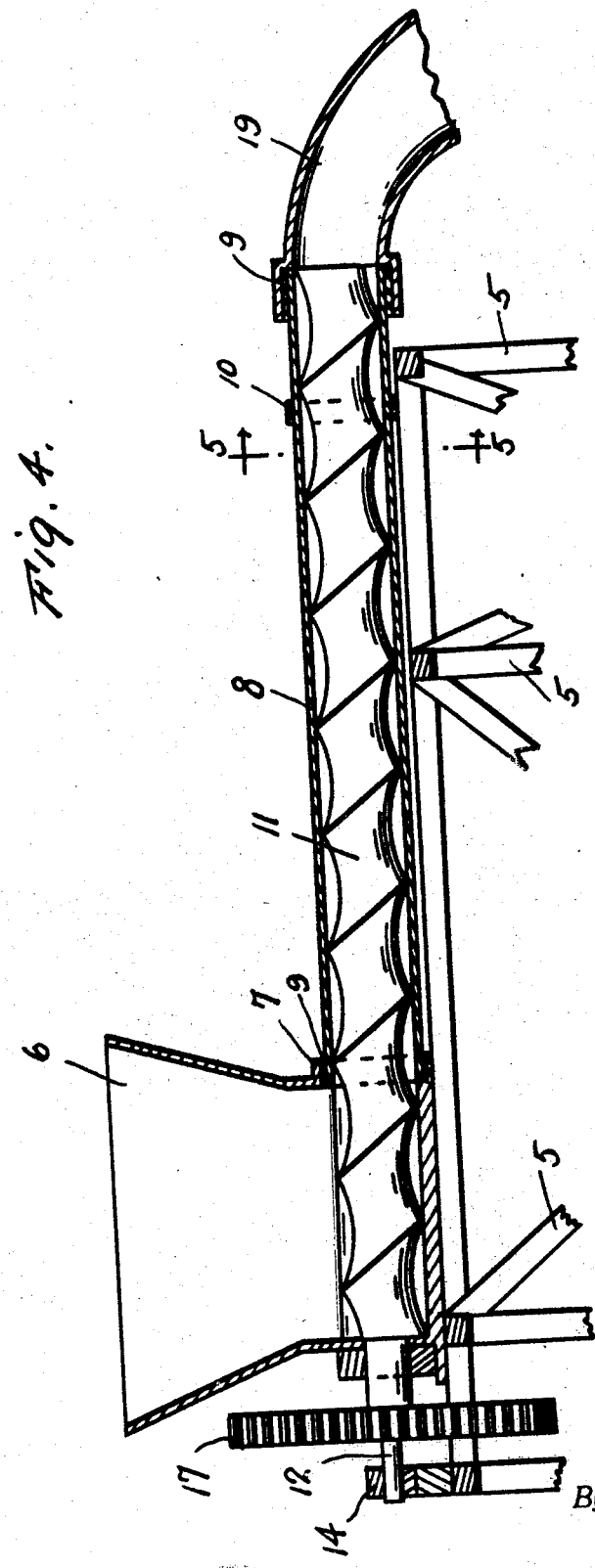
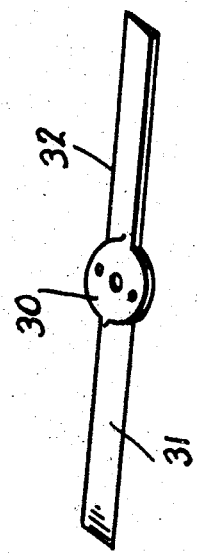
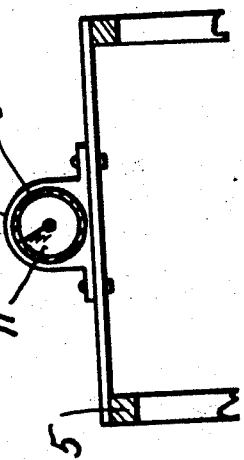
Inventor
Ignacio Nuñez
By Clarence A. O'Brien
Attorney Sept. 8, 1931.  I. NUÑEZ  1,822,309
DOUGH CUTTING MACHINE
Filed July 11, 1930    4 Sheets-Sheet 4
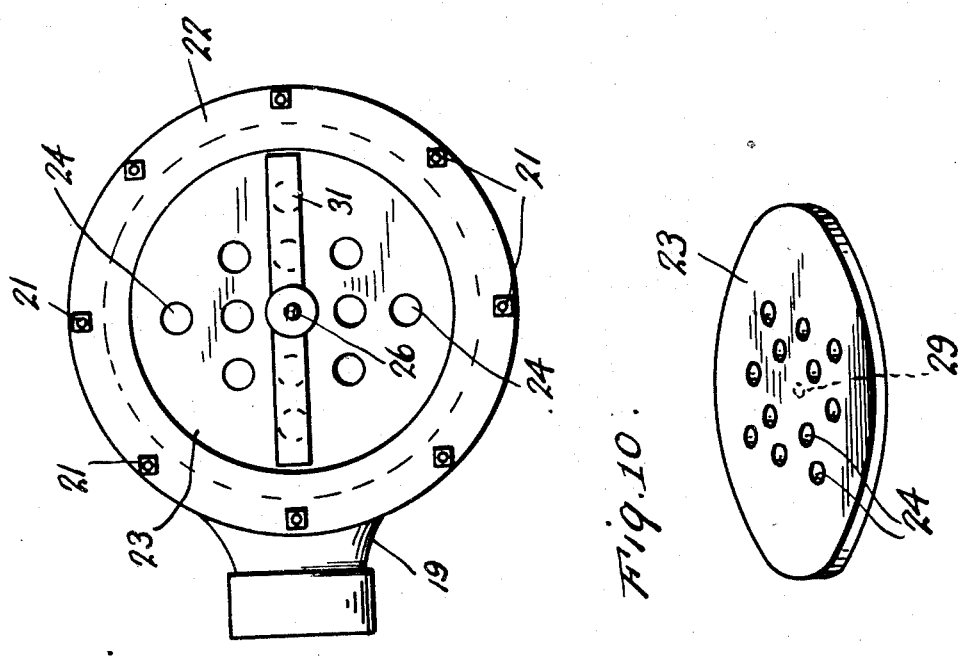
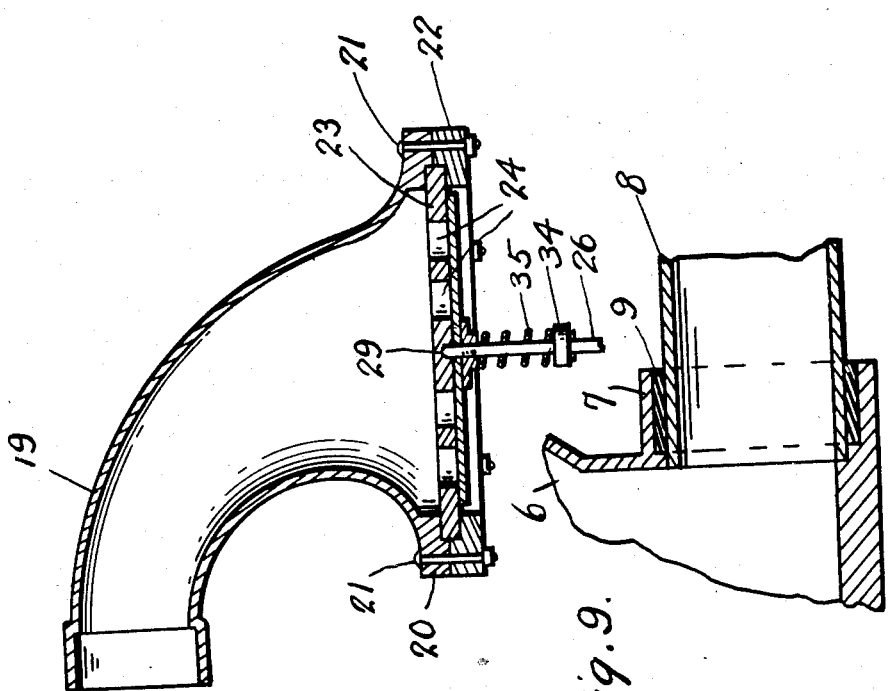
Inventor
Ignacio Nuñez
By Clarence A. O'Brien
        Attorney Patented Sept. 8, 1931

1,822,309

UNITED STATES PATENT OFFICE

IGNACIO NUÑEZ, OF SAN LUIS POTOSI, MEXICO

DOUGH CUTTING MACHINE

Application filed July 11, 1930. Serial No. 467,311.

The present invention relates to a machine for packing and cutting dough to make macaroni, spaghetti, noodles and the like, and the prime object of the invention resides in the provision of a machine having means for packing the dough and forcing it through a shaping and cutting mechanism.

A still further very important object of the invention resides in the provision of a machine of this nature which is exceedingly simple in its construction, inexpensive to manufacture, strong and durable, compact and convenient in its arrangement of parts, thoroughly efficient and reliable in use and operation, and otherwise well adapted to the purpose for which it is designed.

In the drawings:

Figure 1 is a side elevation of a machine embodying the features of my invention, Figure 2 is an end elevation thereof, Figure 3 is another end elevation thereof, Figure 4 is a vertical longitudinal section through the hopper and the auger, Figure 5 is a vertical transverse section taken substantially on the line 5—5 of Figure 4, Figure 6 is a perspective view of the cutter, Figure 7 is a vertical section through the nozzle and cutter, Figure 8 is a bottom plan view thereof, Figure 9 is a detail sectional view through the juncture of the hopper with the auger, and Figure 10 is a perspective view of the shaping disk.

Referring to the drawings in detail it will be seen that the numeral 5 denotes a supporting structure on the top of which is a hopper 6 having an outlet neck 7 projecting from the bottom thereof to receive one end of cylindrical auger casing 8, a gasket 9 being interposed between the neck 7 and the end of the casing 8 therein. A strap 10 anchors the casing 8 to the supporting structure 5.

An auger 11 is rotatably mounted in the casing 8 and adjacent to the hopper 6 has a shaft 12 journalled in a bearing 14 on the structure 5. Numeral 15 denotes a power shaft journalled in the structure 5 with a power wheel 16 thereon. Gearing 17 operatively connects the shaft 15 and the shaft 12.

A nozzle 19 is coupled with the end of the casing 8 remote from the hopper 6 and is curved and flared downwardly therefrom terminating in a rim 20 to which is bolted as at 21 a ring 22 which holds in place a disk 23 having a plurality of suitably shaped apertures depending upon the shape of the dough desired when forced therethrough and of course there may be any number of the apertures 24.

A frame 25 depends from the ring 22 and has a shaft 26 journalled through the bottom thereof to be vertically disposed, there being a bearing 27 in the bottom of the frame for this purpose and a collar 28 on the shaft against the bearing 27. This shaft is vertically disposed having its upper end journalled in a recess in the center of the disk 23 as is indicated at 29. A cutter comprises a hub 30 on the shaft 26 and a pair of knives 31 radiating outwardly in diametrically opposite directions therefrom and having sharpened edges 32 to engage the under surface of the disk 23. A collar 34 is on the shaft 26 and a spring 35 is interposed between the collar 34 and the cutter to hold the cutter up against the disk.

A shaft 38 is journalled longitudinally in the lower portion of the structure 5 and is operatively connected by gearing 39 with the shaft 26. A shield or hood 40 is disposed on the shaft 26 over the gearing 39. The shaft 38 is operatively connected with the shaft 15 through a variable feed belt and pulley connection 41.

When the shaft 15 is rotating and dough is placed in the hopper 6 it will be seen that the auger 11 conveys this dough into the nozzle 19 to pack the dough against the disk 23 forcing portions of the dough through the apertures 24 to be severed in strips and the like by the knives of the cutter so as to be caught in a suitable receptacle which may be provided for the purpose.

It is thought that the construction, operation, utility and advantages of the invention will now be quite apparent to those skilled in this art without a more detailed description thereof.

The present embodiment of the invention has been described in considerable detail merely for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

An apparatus of the class described comprising a tubular casing of even diameter throughout its length, an auger feeder in and conforming in size to said casing, means through which dough may be fed to the rear portion of said casing, a nozzle arranged to receive dough from the forward end of said casing and extending forwardly and downwardly therefrom and gradually increased in diameter from the casing to the nozzle discharge, an apertured disk across the discharge of the nozzle, a cutter rotatable against the underside of the disk, an upright shaft on which the cutter is mounted, said shaft having an abutment spaced below the cutter, a coiled extension spring surrounding the shaft and interposed between the said abutment and the cutter, a main frame supporting the tubular casing and the auger feeder in substantially horizontal position, a horizontal drive shaft mounted in said frame, a driving connection intermediate of said shaft and the auger feeder, a second horizontal shaft mounted in the frame and connected by an interposed driving connection with the drive shaft and also connected by gearing with the shaft on which the cutter is mounted, and a shield connected to and carried by the shaft on which the cutter is mounted and flared downwardly and having a lower open end disposed about said gearing.

In testimony whereof I affix my signature.

IGNACIO NUÑEZ.